United States Patent
Dang et al.

(10) Patent No.: US 8,843,953 B1
(45) Date of Patent: Sep. 23, 2014

(54) METHODS AND APPARATUS FOR PROVIDING PARENTAL OR GUARDIAN CONTROL AND VISUALIZATION OVER COMMUNICATIONS TO VARIOUS DEVICES IN THE HOME

(75) Inventors: Niem Dang, Sterling, VA (US); John Chen, Broadlands, VA (US); David W. Chen, Ashburn, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

(21) Appl. No.: 13/531,575

(22) Filed: Jun. 24, 2012

(51) Int. Cl.
*H04N 7/16* (2011.01)
*H04N 21/454* (2011.01)

(52) U.S. Cl.
CPC .................................. *H04N 21/454* (2013.01)
USPC ........................................................... 725/28

(58) Field of Classification Search
CPC .............. H04N 21/43; H04N 21/4405; H04N 21/4408; H04N 21/444213
USPC ................................ 725/25–31, 80
See application file for complete search history.

(56) References Cited

U.S. PATENT DOCUMENTS

| | | | |
|---|---|---|---|
| 7,916,652 B1* | 3/2011 | Lima et al. ..................... | 370/252 |
| 7,970,388 B2 | 6/2011 | Pfeffer et al. | |
| 2002/0184620 A1* | 12/2002 | Davies et al. ................... | 725/25 |
| 2004/0261093 A1* | 12/2004 | Rebaud et al. .................. | 725/25 |
| 2006/0218575 A1* | 9/2006 | Blair ............................... | 725/28 |
| 2007/0294369 A1* | 12/2007 | Ginter et al. ................... | 709/217 |
| 2008/0246605 A1 | 10/2008 | Pfeffer et al. | |
| 2009/0235300 A1* | 9/2009 | Hayashi .......................... | 725/28 |

* cited by examiner

*Primary Examiner* — Benjamin R Bruckart
*Assistant Examiner* — Aklil Tesfaye
(74) *Attorney, Agent, or Firm* — Straub & Pokotylo; Michael P. Straub; Stephen T. Straub

(57) ABSTRACT

Methods and apparatus for providing a supervisor such as a parent or guardian with a way to monitor and control the delivery of content, e.g., video and audio programs, to users of devices within a home. Exemplary embodiments include methods and apparatus for operating a home network monitoring device located in a home including detecting delivery of content to one or more users in the home, storing, in the home, portions of content delivered to a first user, presenting some of the stored portions of content to a person responsible for setting content restrictions applicable to the first user, and subjecting further content delivery to the first user via the home network to restrictions established by the person responsible for setting content restrictions applicable to the first user. Some embodiments also detect and report potential attacks, e.g., cyber attacks, on the home network.

22 Claims, 10 Drawing Sheets

| CONTENT RESTRICTIONS | USER ID FOR WHICH RESTRICTIONS ARE TO BE APPLIED | DEVICES FOR WHICH RESTRICTIONS ARE TO BE APPLIED |
|---|---|---|
| PORN VIDEO CHANNEL | 001, 002, 004 | 8805 |
| PORN WEB SITE ADDRESS | 001, 002, 004 | 8805 |
| R RATED PROGRAMS | 001 | |
| HTTP://WWW.BAD.COM | 001, 004 | 8805 |
| VIOLENT INTERNET GAME IDENTIFIER | 002 | |
| ADDRESS OF WEB PAGE WITH VIOLENT IMAGES | 004 | 8805 |
| SATELLITE RADIO CHANNEL ID | 001 | |
| TELEVISION SERIES PROGRAM IDENTIFIER | 002 | |
| BAD@GMAIL.COM | 004 | 8805 |

FIGURE 4

| DEVICE IDENTIFIER | DEVICE TYPE | PERMITTED USERS ID | DEVICE ADDRESS |
|---|---|---|---|
| 8801 | COMPUTER | 003 | ADDRESS 1 |
| 8802 | COMPUTER | 001, 002, 003, 004 | ADDRESS 2 |
| 8803 | LAP TOP | 001, 003 | ADDRESS 3 |
| 8804 | SET-TOP BOX | 002, 003 | ADDRESS 4 |
| 8805 | TELEVISION | 004 | ADDRESS 5 |
| 8806 | SMART PHONE | 001, 002, 003, 004 | ADDRESS 6 |

FIGURE 5

METHODS AND APPARATUS FOR PROVIDING PARENTAL OR GUARDIAN CONTROL AND VISUALIZATION OVER COMMUNICATIONS TO VARIOUS DEVICES IN THE HOME

FIELD OF INVENTION

The present invention relates to methods and apparatus for providing parental or guardian control and visualization over the delivery of content to users and/or devices in the home.

BACKGROUND OF THE INVENTION

The objective of providing parental control of television viewing has been around for more than a decade, and has been primarily implemented using V-Chip technology. V-Chip technology used in television set receivers allows the blocking of the display of television programs based on their ratings category. It is intended for use by parents to manage their children's television viewing. Since January 2000, the Federal Communications Commission (FCC) has required all new television sets with screens 13 inches or larger to be equipped with V-Chip technology.

V-Chip technology generally works in the following manner. Most television programs with the exception of news, sports and unedited movies on premium cable channels are rated in accordance with the "TV Parental Guidelines." Commercials are not rated. The ratings are described in the following manner by the FCC.

TV-Y (Directed to All Children) This program rating is found only in children's shows. The rating means the program is designed to be appropriate for all children. Whether animated or live-action, the themes and elements in this program are specifically designed for a very young audience, including children from ages 2-6.

TV-Y7 (Directed to Older Children) This program rating is found only in children's shows and means the program is designed for children age 7 and above. It may be more appropriate for children who have acquired the developmental skills needed to distinguish between make-believe and reality. Themes and elements in this program may include mild fantasy or comedic violence, or may frighten children under the age of 7. Therefore, parents may wish to consider the suitability of this program for their very young children.

TV-Y7-FV (Directed to Older Children—Fantasy Violence) This program rating is found only in children's shows and means the program is designed for children age 7 and above. The FV designation indicates the program contains fantasy violence that may be more intense or more combative than other programs in TV-Y7 category.

TV-G (General Audiences) This program rating means the program is suitable for all ages but is not necessarily a children's show. The program contains little or no violence, no strong language and little or no sexual dialogue or situations.

TV-PG (Parental Guidance Suggested) This program rating means parental guidance is recommended and that the program may be unsuitable for younger children. This rating may also include a V for violence, S for sexual situations, L for language, or D for suggestive dialogue.

TV-14 (Parents Strongly Cautioned) This program rating means that the program may be unsuitable for children under 14. This rating may also include a V for violence, S for sexual situations, L for language, or D for suggestive dialogue.

TV-Mature (Mature Audience Only) This program rating means that the program is intended to be viewed by adults and be unsuitable for children under 17. The program also contains one or more of the following: a V for violence, S for sexual situations, L for language, or D for suggestive dialogue.

Movie ratings are assigned on a voluntary basis by the Motion Picture Association of America and the National Association of Theater Owners after a board of parents known as the Classification and Rating Administration views, discusses and votes on a films rating. The movie ratings and a description of their meanings are now discussed.

G (General Audience) The movie's content is appropriate for all ages.

PG (Parental Guidance Suggested) This rating means that parental guidance is recommended and some material may be unsuitable for children.

PG-13 (Parents Strongly Cautioned) This rating means that some material may be inappropriate for children under 13.

R (Restricted) This rating means some material may be inappropriate for children under 17, and if shown in movie theaters, requires accompanying parent or adult guardian.

NC-17 (No One 17 and Under Admitted) This rating means the movie contains material that most parents would consider inappropriate for children 17 and under, and if shown in a movie theater, no one 17 and under would be admitted.

This television program and/or movie rating information is encoded and transmitted with the television program and/or movie. The rating information typically is displayed in the upper left corner of the television screen during the first 15 seconds of each program or movie and often after commercial breaks. The ratings are also typically included in TV listings appearing in print and in electronic program guides so that parents may have a general understanding of a program's rating prior to the transmission of the program. The V-Chip in each television, digital-to-analog converter box, or set-top box is then programmed by a parent typically using the remote control provided with the equipment to select the channels and specific ratings assigned to TV programs and movies to be blocked from display. A password is usually used to lock the selected channels and any programs and movies with the selected ratings blocking them from being displayed. Upon receipt of a television program or movie, the V-Chip will decode the encoded ratings and block the program or movie from being displayed if it includes one of the selected ratings. Additionally, the V-Chip will also block the selected channels from being displayed. The password used to lock the content from being displayed can be used to unlock or override the blocking setting in instances where viewing of the blocked material is deemed appropriate, e.g., when the parent wishes to watch the blocked program.

Such technologies as the V-Chip technology are very restrictive, and in some instances go against how some parents and/or guardians like to see their children learn and develop. For example, they require access to television programs and movies to be restricted on ratings with which a parent may not agree. For example, the parent or guardian may have a different view or perspective on what specific content they find objectionable and do not wish their children to view. In addition, such technologies are based on a single medium, V-Chip technology for example is only for television, and not for use with YouTube videos, the display of content on Internet Websites, content presented to cell phones, radio broadcasts and other services provided to connected devices within the home. The increase in the variety of ways in which content, e.g., images, video and audio programs, is distributed to different types of devices located in the home beyond television set receivers such as over the Internet to computers, lap tops, notebooks, and tablets has also made the V-Chip and similar technologies inadequate for monitoring and restricting content to users of devices, e.g., children, within the home.

In addition to the V-Chip technology, there are a number of client based software programs, such as KidsWatch, that are installed on a child's computer and allow a parent to set specific time controls to manage when the child can access the computer, the Internet, individual programs, games and web sites, as well as providing the ability to block any website a parent does not wish his or her child to visit. This software provides the parent the option of setting specific log-times and allows for these to be customized by child. It provides features of predator alerts as well as the ability to monitor all email and chat. KidsWatch can be operated remotely, for additional security, when the parent is away from home. It also provides additional Internet protection as it attempts to block spyware and phishing attacks. KidsWatch software and similar client based programs are very restrictive on the content to be blocked, are installed on each individual computer used by the child, and are directed to restricting a child's computer use and not television programming or audio content consumption.

From the above discussion it should be appreciated that there is a need for a more flexible approach to the monitoring and restriction of content distributed to and/or consumed by users of devices located in the home. While known attempts to address these needs have obtained some level of success there remains a need for new and improved methods and apparatus for parents, guardians and/or supervisors to monitor and control the viewing and listening habits of their children, guests and charges for the various devices and media available for use in the home.

SUMMARY OF THE INVENTION

The present invention addresses, among other things, the need for monitoring and control of the content delivered to users of a home network. The present invention provides a way for a supervisor/parent to passively monitor the flow of content, e.g., video and audio programs, images, television programs, satellite video and radio transmissions and Internet video, web pages, podcasts, from numerous sources to one or more children through a home network to various devices used by the children in the home. This is accomplished by storing a portion of the content delivered to one or more users and/or devices along with content source identification information. The parent/supervisor at a later time is then presented the portion of stored content for evaluation in determining whether the content is inappropriate for the one or more users, e.g., children being monitored. If the content is deemed inappropriate by the supervisor/parent, the supervisor/parent can then set restrictions on a per user and/or device basis restricting the further delivery of the same content or content from the same source, e.g., Internet address, cable channel, or satellite channel.

Exemplary embodiments include methods and apparatus for operating a home network monitoring device located in a home including detecting delivery of content to one or more users in the home, storing in the home, portions of content delivered to a first user, presenting some of the stored portions of content to a person responsible for setting content restrictions applicable to the first user, and subjecting further content delivery to the first user via the home network to restrictions established by the person responsible for setting content restrictions applicable to the first user.

In some implementations of the present invention, monitoring also includes detecting whether attacks or potential attacks are being made on the home network. In such situations, information about the attack/potential attack is collected, e.g., source of the attack/potential attack, address or addresses from which the attack/potential attack is emanating, time the attack/potential attack commenced and the length of the attack/potential attack wherein the collected information maybe, and in some embodiments is, reported to a third party such as a government entity responsible for investigating network attacks. In some variations of the present invention, transmissions from addresses identified as the source of the attacks/potential attacks are forwarded to a third-party for analysis, e.g., a third party server dedicated to analyzing web attacks.

Various additional features and advantages of the present invention are discussed in the detailed description which follows.

BRIEF DESCRIPTION OF THE DRAWINGS

FIG. 4 illustrates an exemplary listing of content restrictions to be applied to users and devices in accordance with one embodiment of the present invention.

FIG. 5 illustrates a table listing exemplary device profile information in accordance with one embodiment of the invention.

DETAILED DESCRIPTION

Figure 1:
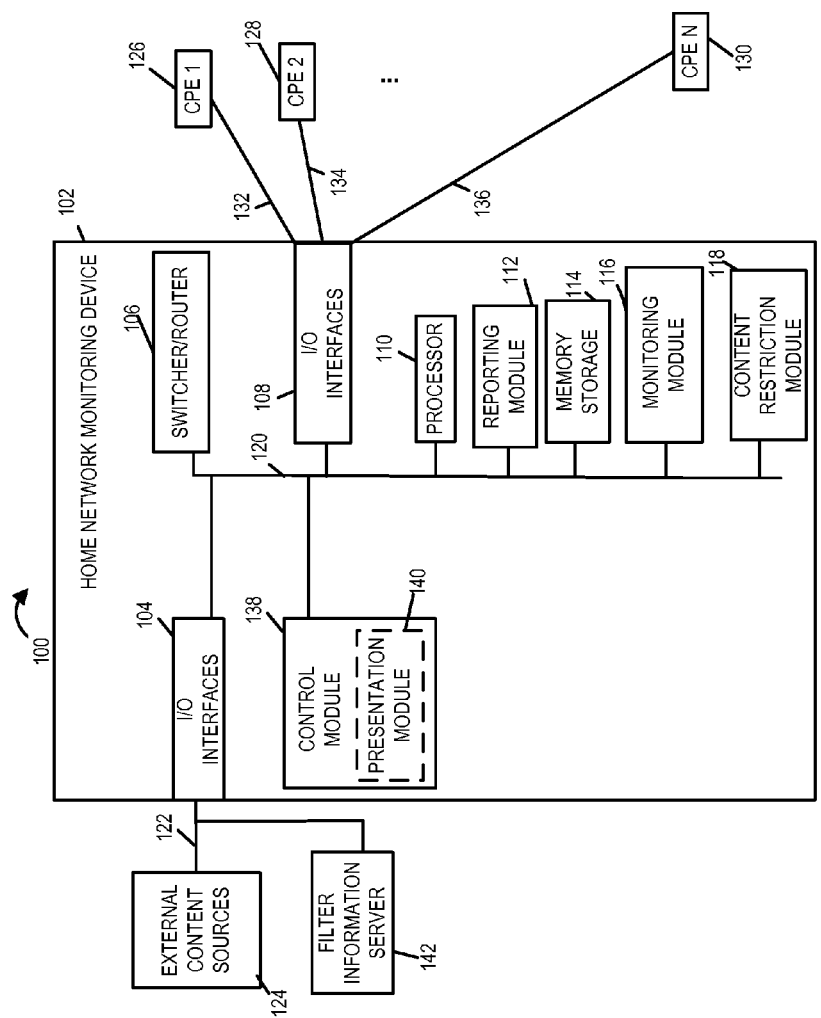
FIG. 1 illustrates an exemplary home network including an exemplary home network monitoring device in accordance with one embodiment of the present invention.

The current invention is applicable to various systems, devices and methods for providing a parent, guardian, or supervisor with control and visualization capabilities over the flow of information and data to the various users and devices within a home. It further provides a way to detect and report attacks on home networks.

The present invention includes methods, systems, and apparatus for providing a parent, guardian or supervisor with control and visualization capabilities over the flow of information and data to various devices within a home (e.g., computers, cell phones, set-top boxes, television sets and other CPE devices) and a centralized way to monitor and navigate the use of content on the devices. Once the flow is known, then parents, guardians, and/or supervisors can restrict or stop the stream of content if it is deemed inappropriate for their children or the individuals they are supervising by sending a command, e.g., a message or control signal, to the command and control module, device or system. The system can respond for a traditional cable service by tuning the channel on the set-top box to an unrestricted channel, or turn the set-top box off completely. For an Internet enabled device in the home, the system can respond by injecting disconnect packets on both sides of the connection, and then block the connection from re-establishing. The methods, systems, and apparatus of the present invention is also able to block all connection from the home to the restricted content or web site.

In some embodiments of the present invention, the methods are implemented as services that are delivered either as an add-on service to an application or a network application to an existing ecosystem. In some embodiments of the present invention, the methods, systems and apparatus work as a passive observer of the children's or supervised user's viewing and/or listening habits, and allow the parents, guardians, and/or supervisor to restrict their children's or supervised user's viewing/listening of different media in an easy to use, convenient, and centralized command and control module or device. In accordance with some embodiments of the present invention the apparatus and/or system monitors and keeps records on the channels, and programs that a set-top box or other CPE device is tuned to, and selectively records a portion, e.g., a few seconds or minutes, of the video programs that is currently playing for later review by the parents, guardians and/or supervisors of the individual, e.g., child, being supervised. For other IP based devices, one or more embodiments of the present invention, use stateful network packet inspection at the egress point of the home to determine the websites, audio and video content the individuals being supervised, e.g., children, are consuming, e.g., viewing or listening to, regardless of what devices they are using to watch or listen to the content. In some embodiments this viewing and listening data includes the amount of time spent, what content the individual, e.g., child, was consuming (e.g., viewing or listening to), and when the individual was consuming the content, e.g., watching and/or listening to television, video, audio, and/or the Internet. This consumption or viewing and listening data is then stored for later review by the parent, guardian, and/or supervisor, and can be used to restrict and/or deny the supervised individual's, e.g., child's, further access by the parent, guardian and/or supervisor. This provides the parents, guardians, and supervisors a more active role in protecting the individuals they are supervising, e.g., children, while allowing the supervised individuals, e.g., children, more freedom to behave autonomously as the parents, guardians, and/or supervisors so choose. In some embodiments, the methods, systems and apparatus of the present invention, allow a parent, guardian and/or supervisor with the proper level of access control to monitor, navigate and enforce restrictions on the content delivered to any connected devices that exist in the same household.

Embodiments of methods, systems and apparatus of the present invention can be used to deliver parental and/or supervisory control technologies inside the home to monitor and restrict the delivery of content to one or more users of devices in the home including cable and broadcast television, connected devices (including both wired or wireless devices), the Internet (e.g., browser history), Internet video on video hosting sites or vodcasts, broadcast and satellite radio, and non-networked devices (such as DVRs, VCRs, and MP3 players).

FIG. 1 illustrates an exemplary home network 100 in accordance with one embodiment of the present invention. In the exemplary embodiment illustrated in FIG. 1, the home network monitoring device 102, customer premise equipment devices 1 (126), 2 (128) through N (130), and communication links 132, 134 through 136 form a home network located in a home or on a customer's premises. The exemplary embodiment of the home network monitoring device 102 includes I/O Interfaces 104, Switcher/Router 106, I/O Interfaces 108, Processor 110, Reporting Module 112, Memory Storage 114, Monitoring Module 116, Content Restriction Module 118, a Control Module 138, an optional Presentation Module 140 contained within the Control Module 140, and a communication link 120.

The exemplary home network 100 receives content from external content sources 124 over communication link 122. Examples of received content include video streams, audio streams, multimedia data, programs, website data, images, e-mail messages, text messages, emergency broadcast transmissions, video gaming transmissions, cable services (e.g., video on-demand), Internet services (e.g., multimedia programs), cable and broadcast television, satellite television, broadcast and satellite radio, and Internet video from video hosting sites or vodcasts.

Exemplary external content sources include satellite transmissions; terrestrial off-air; IP data networks; fiber-optic networks; video content storage servers, e.g., video on-demand servers, movie on-demand servers; audio content servers; e-mail servers; storage media; content storage databases; game servers; emergency broadcast systems; Internet websites; vodcast storage servers; and other external content distribution devices and/or network nodes. In some embodiments, the external content sources may, and do, include individuals and/or systems that record audio and/or video on wired and/or wireless devices and transmit the recorded audio and/or video to one or more users of the home network 100 such as to a user operating CPE device 1 126.

In the exemplary embodiment, the home network monitoring device 102 receives content filtering information from a filter information server 142 over communication link 122. Exemplary content filtering information may be, and in some embodiments does, include information identifying an Internet content source which is to be blocked, content rating information indicating a rating assigned to particular content, information identifying content which is to be blocked. For example, filter information can include the titles of movie programs, television programs or series, radio programs, video or audio programs, old or new parental ratings, information identifying web addresses, information identifying one or more cable or satellite channels on which adult content is provided, information identifying Internet, network, web, and/or e-mail addresses. In some embodiments, filter information is received from a number of filter information servers and/or systems.

In the exemplary embodiment illustrated in FIG. 1, home network monitoring device 102 is coupled to the external content sources 124 via communication link 122. The home networking monitoring device 102 receives content from one or more external content sources 124 via communication link 122 through I/O interfaces 104 which may, and in some embodiments does, include one or more receivers and/or transmitters. Exemplary link 122 may be, and in some embodiments is, one or more physical and/or logical bi-directional and/or uni-directional links for communicating content, control messages, signals and/or data between one or more components of home network monitoring device 102 and external content sources 124. The type of physical transmission medium of the one or more links may, and in some embodiments does, vary. Exemplary links include wired and wireless links, e.g., fiber-optic cables, coaxial cables, satellite transmissions, microwaves and radio frequency waves.

In the exemplary embodiment of the present invention, the home network monitoring device is a gateway device that connects the home network to external networks and/or content sources and acts as the policing point for the monitoring and restriction of the delivery of content through the home network 100 to users of CPE devices coupled to the network.

The home network monitoring device 102 includes a control module 138 that normally controls the flow of content through the home network monitoring device 102 and controls the switcher/router 106 as to what content should be routed to each device connected to the home network 100.

The home network monitoring device 102 includes a monitoring module 116 that monitors the content of data being delivered through the home network to users of CPE devices operating on the home network 100. The monitoring module 116 also monitors for activity indicative of an attack or potential attack, e.g., a cyber attack, on the home network 100.

Figure 2:
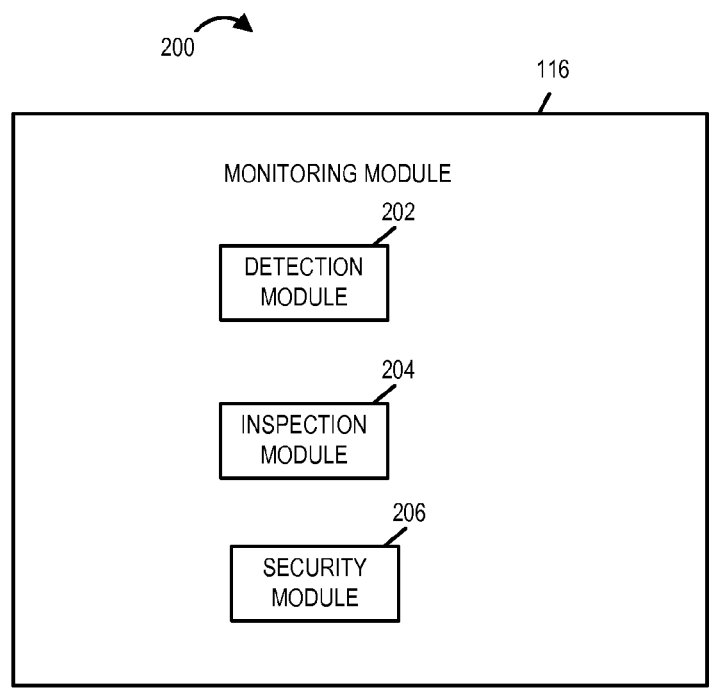
FIG. 2 illustrates details of exemplary monitoring module 116 in greater detail.

FIG. 2 is a diagram illustrating portions of exemplary home network monitoring device 102 in greater detail. Elements of FIG. 2 which are the same or similar to the elements of FIG. 1 are identified using the same reference number. In particular, diagram 200 of FIG. 2, shows exemplary monitoring module 116 in greater detail. Exemplary monitoring module 116 includes a detection module 202, an inspection module 204, and a security module 206. In some embodiments, the detection module 202 includes the inspection module 204 and security module 206. The detection module 202 is responsible for, among other things, the detection of signaling and content data being delivered to users of the home network. The inspection module is responsible for performing inspections on the signaling data and content being delivered to the CPE devices on the home network 102 for the purposes of monitoring and storing portions of the detected content being delivered and for determining if the content should be restricted, that is prevented, from being delivered to one or more users and/or devices using the home network 100. In some embodiments, the inspection module 204 uses stateful packet inspection when the content is directed to an IP device being used on the home network 100. In some embodiments in which the detection module performs the inspection function the detection module uses stateful packet inspection when the content detected is directed to an IP device being used on the home network 100. In some embodiments, stateful packet inspection whether performed by the inspection module 204 or the detection module 202 includes detecting a website address which is the source of content being delivered to one or more users operating devices on the home network 100. In some embodiments the stateful packet inspection further includes performing an inspection of at least one of audio or video packet payload content. The security module 206 monitors the activity at the home network 100 and determines if the activity is indicative of the home network 100 being attacked/potentially attacked, e.g., a cyber attack.

If the security module 206 of the monitoring module 116 determines that the home network 100 is under attack/potentially under attack, it sends a message to the reporting module 112 via the communication link 120 requesting it report the attack/potential attack to one or more home network 100 users including the home network 100 administrator and/or one or more third parties, collects data about the attack/potential attack and/or the attackers/potential attackers, and provides the collected information to the reporting module 112. Exemplary information about the attack/potential attack and/or attackers/potential attackers includes the address or addresses from which the attack/potential attack was originated, information regarding the source or sources of the attack/potential attack, the date and time at which the attack/potential attack occurred, length of time the attack/potential attack occurred, and the manner of the attack/potential attack.

The reporting module 112 of the home network monitoring device 102 upon receipt of the message from the security module 206 indicating the home network 100 is under attack/potential attack will log the event and store information about the attack/potential attack and the attackers/potential attackers in memory storage 114. Memory storage 114 may be, and in some embodiments is, non-violate memory. In some embodiments, memory storage 114 is a combination of ROM, RAM. In some embodiments memory storage 114 contains secure and unsecure ROM and RAM memory storage. Instructions, settings and content are in some embodiments, stored in ROM. The reporting module will also then transmit a report to a third party such as an Internet Service Provider, a government entity, a cable operator, a Multiple Systems Operator, other network operator or security service provider about the attack/potential attack via communication link 122 or via an alternative communication link not affected by the attack/potential attack. The reporting module 112 will send the third party at least a portion of the information collected about the attack/potential attack and the attackers/potential attackers. In some embodiments, the security module 206 will request the control module 138 to instruct the switcher/router 106 to forward incoming transmission from the attacker's/potential attacker's address to the third party entity located outside of the home network. In some embodiments, the third party entity may be, and is, a government entity responsible for dealing with attacks on data/communications networks. In some embodiments, the reporting module will not report the attack/potential attack to a third party if the security module 206 determines that the attack/potential attack originated from within the home network 100. In such instances, the reporting module will still notify the home network 100 administrator of the attack/potential attack.

Home network monitoring device 102 in some embodiments of the present invention in addition to receiving content from one or more external sources also stores content in memory storage 114. Such content may have been received from the one or more external sources or from the CPE device 1 126, CPE device 2 128 through CPE N 130 coupled to the home networking monitoring device. In such instances, the home networking monitoring device 102 will store the content identification information and source identification information regarding the stored content in memory storage 114 as well. Subsequent delivery of content to a user and/or device of the home network 100 from memory storage 114 will also be monitored and restricted in accordance with the user content restriction requirements assigned for the user and/or content restriction requirements assigned for the device. In some embodiments the memory storage 114 may be, and is in a separate device, such as for example a hard drive or DVR connected to the home network 100.

While in the exemplary embodiment the home network monitoring device 102 is illustrated as a separate device, the home network monitoring device and/or its functionality may be, and in some embodiments is, incorporated in one or more devices which control the flow of content into a home network. For example, in some embodiments the home network monitoring device is a wired and/or wireless router. In some embodiments, the home network monitoring device 102 is a cable modem. In some embodiments, the home network monitoring device 102 is a set-top box. In some embodiments, the home network monitoring device 102 is a set-top box with a cable modem. In some embodiments of the present invention, the home network monitoring device 102 is a home network access node. In some embodiments of the present invention, the functionality of the home network monitoring device is distributed among a number of devices including a set-top box, a cable modem and a router each which monitors and controls at least a portion of the content flowing through the device to one or more CPE devices being used on the home network by one or more users. In some embodiments, each of these separate devices store a portion of the content being monitored for each user in a central storage location in the home including data identifying the content and the source of the content. Storage of portions of content consumed and information regarding users consumption habits is kept in memory in the home for privacy reasons. By storing this information in the home the data on a supervised individual's content consumption habits can be exclusively controlled by the supervisor, e.g., parent or guardian of the child or user being supervised.

In the exemplary embodiment the home network monitoring device 102 is coupled to exemplary CPE device 1 126, CPE device 2 128 through CPE N 130 via communication links 132, 134 through 136 respectively. Information, data, signals and content is outputted from I/O Interfaces 108 which may, and in some embodiments does, include one or more transmitters and/or receivers to links 132, 134 through 136. As discussed in connection with link 122, link 132, 134 through 136, may be, and in some embodiments are, one or more physical and/or logical bi-directional and/or uni-directional links for communicating content, control messages, signals and/or data between home network monitoring device 102 and CPE devices 1 (126), 2 (128) through N (130). The type of physical transmission medium of the links may, and in some embodiments does, vary. Exemplary links include wired and wireless links, e.g., coaxial cables, Ethernet cables, fiber-optic cables, and radio frequency waves. The home network 100 of the present invention may be, and in some embodiments is, implemented in other suitable physical and logical network topologies such as bus, point-to-point, ring and daisy chain network topologies. Any suitable physical or logical network topology can be used as long as the content delivered to a CPE device using the communication links of home network 100 is first passed through home network monitoring device 102 for monitoring and control purposes (e.g., the inspection, sampling and storage of content delivered to one or more users and/or devices and enforcement of restrictions preventing or blocking the delivery of content to one or more users and/or devices based on user and/or device content restrictions).

Customer Premise Equipment (CPE) or CPE device refers to any type of electronic device located in a customer's premises or other suitable location. In the present invention, the CPE devices are coupled to the home network monitoring device so that content delivered to a user of the CPE device can be monitored and controlled by a parent, guardian or other person responsible for monitoring and controlling the delivery of content to the user. Exemplary CPE devices include set-top boxes, digital video recorders (DVRs), personal computers, lap tops, tablets, wireless devices (e.g., cell phones, smart phones, personal digital assistants), gaming consoles, televisions, cable modems, embedded multimedia personal adapters (eMTAs), audio players (e.g., MP3 players), and wired and wireless routers. CPE devices are typically used to access and present, e.g., play or display, content such as for example video programs, audio programs, podcasts, movies, games, Internet website pages and television programs.

Figure 3:
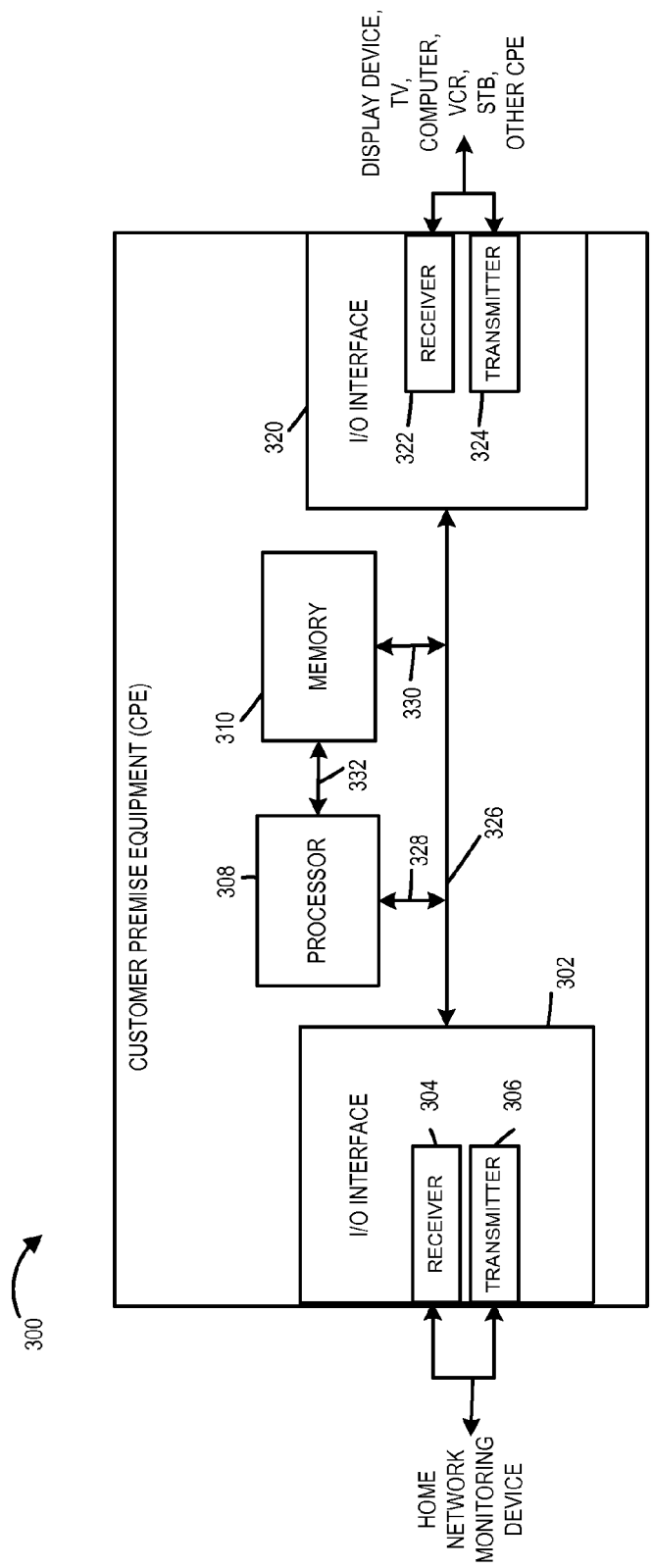
FIG. 3 illustrates some of the implementation details of an exemplary Customer Premise Equipment (CPE) device in accordance with one embodiment of the present invention.

FIG. 3 illustrates some of the implementation details of an exemplary Customer Premise Equipment (CPE) device in accordance with one embodiment of the present invention. CPE device 300 includes an I/O Interface 302 for interfacing with the home network, e.g., link 132 of FIG. 1 which may be, and in some embodiments is, an Ethernet cable, a processor 308, a memory 310, an I/O Interface 320 for interfacing to one or more output devices, e.g, display devices, television sets (TVs), computers, video cassette recorders (VCR), digital video recorders (DVRs), set top boxes (STBs), WIFI devices, routers, and other CPE devices. In some embodiments exemplary CPE device 300 may be, and is incorporated, into a TV, set-top box, DVR, etc. I/O Interface 302 of CPE device 300 includes a receiver 304 for receiving communications such as for example control and data messages and/or signals, e.g., MPEG-2 messages, from a content distribution network via the home network monitoring device and communication link coupling the home network monitoring device to the CPE device.

The receiver can, and in some embodiments does, include one or more tuners. The I/O Interface 302 also includes a transmitter 306 for transmitting messages and signals, e.g., requests for service to equipment in the content distribution network via the home network monitoring device and communication link coupling the home network monitoring device to the CPE device. I/O Interface 320 of CPE device 300 includes a receiver 322 and a transmitter 324 for communicating with other devices, e.g., a display device such as a television. CPE 300 also includes internal communication links 326, 328, 330 and 332, e.g., wires and/or wire traces, for coupling various components within the CPE device thereby allowing for the communication of information, data, and control signals between the various components. Communication link 326 may be, and in some embodiments is, a bus to which I/O Interfaces 302 and 320, processor 308 and memory 310 are coupled. Links 328 and 332 couple the processor to link 326 and memory 310 respectively. Link 330 couples memory 310 to the link 326. Memory 310 is used to store data as well as program instructions for the processor 308. In some embodiments of the present invention, CPE memory 310 may, and does, include various types of software instructions including for example operating system software, client application software, program guide software, encoding/decoding software, encrypting/decrypting software, client SDV software, client VOD software, etc. CPE 300 sometimes also contains various specialized software modules and/or hardware modules or circuits including ICs, digital signal processors, and/or ASICs that perform one or more dedicated functions such as encoding and/or decoding MPEG-2 message streams, encrypting/decrypting messages, etc.

In some embodiments, CPE device 300 contains software and/or hardware making it compliant with various standards and/or platforms such as the OCAP (open cable application platform). In some embodiments, CPE device 300 may and does have a number of I/O Interfaces 302 for supporting a plurality of different communication protocols including for example, an Ethernet I/O interface, HDMI I/O interface, coaxial cable interface, USB I/O interface, WIFI I/O interface, DOCSIS 3.0 I/O interface. The CPE device 300 may, and in some embodiments does, contain specialized hardware integrated circuits which provide functionality to support the various wired or wireless communication protocols implemented by CPE device 300. In some embodiments, CPE device 300 has a plurality of I/O Interfaces 320 which also support a variety of different communication protocols including, HDMI, VGA, USB, Ethernet, MPEG-2. In some embodiments, CPE device 300 includes a display, speakers and associated software and hardware to support presentation of images, text, audio and video received at the CPE device. The CPE device 300 typically includes and/or is coupled to one or more user input devices such as for example a remote control, keypad, keyboard, mouse, or touch pad for inputting information. Exemplary information may include user personal identification information (PIN) and commands to control the selection of content to be presented, displayed or played on the device or transmitted from the device through its I/O Interfaces 302 and/or 320. In some embodiments, the CPE device includes a touch screen and associated software and hardware for inputting information into the CPE device.

In the exemplary embodiment illustrated in FIG. 1 a single home network is shown. In some embodiments, one or more home networks may be used in the home with the home network monitoring device 102 acting as the gateway to the home networks so that content delivered to the networks can be centrally monitored and restricted.

Non-networked devices such as VCRs, DVD players, or stand alone game consoles maybe, and in some embodiments are, connected to the home network monitoring device so that the flow content from these non-networked devices flows through the home networking monitoring device and then out to the television sets or other content presentation devices. This allows non-networked devices whose content is delivered to a user within the home to have the content monitored, portions of the content and information such as identification and source information stored for review, and restrictions applied to the delivery of such content.

Figure 6A:
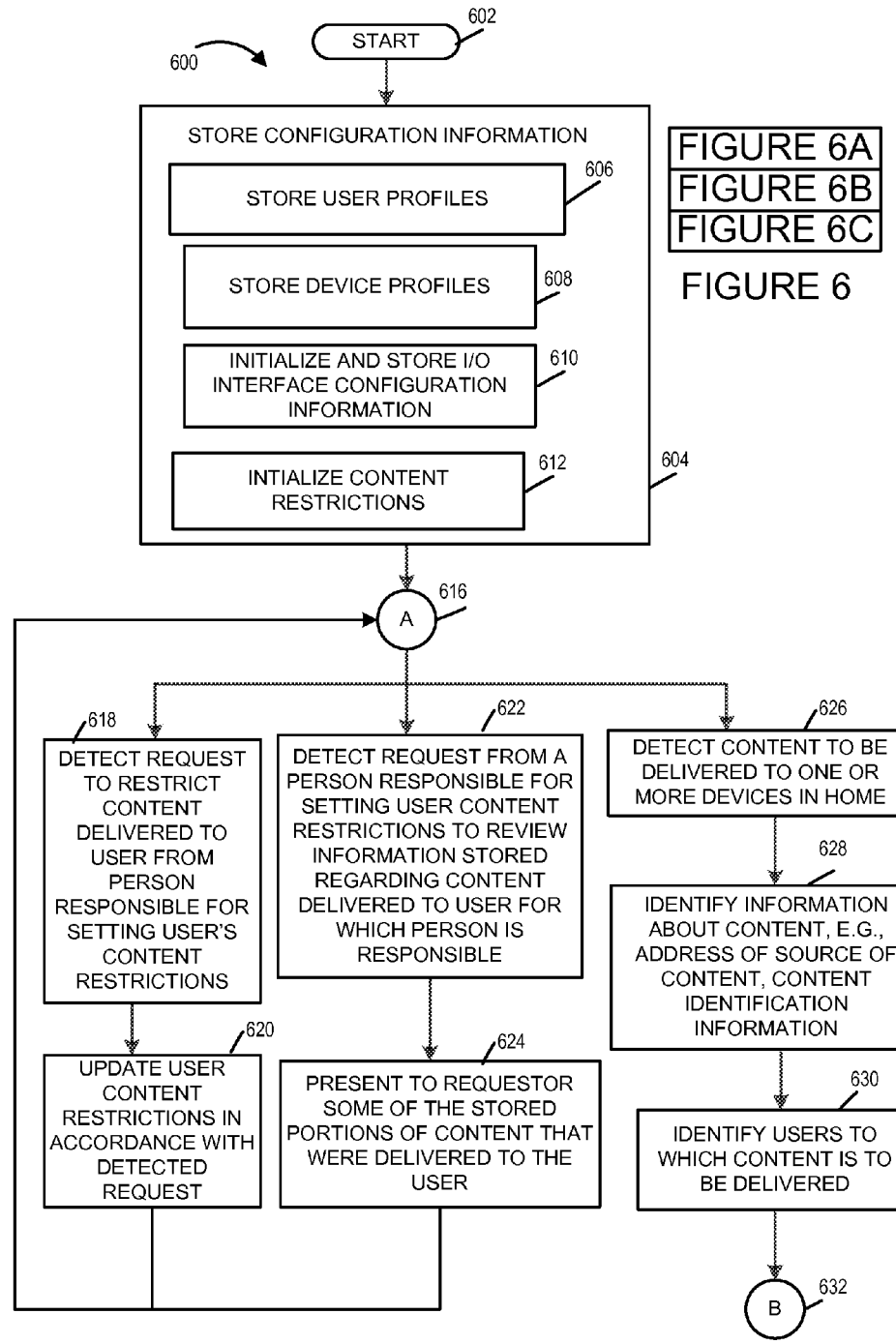
FIG. 6, which comprises the combination of FIGS. 6A, 6B, and 6C, illustrates the steps of an exemplary method for operating a home network monitoring device located in a home in accordance with one embodiment of the present invention.
Figure 6B:
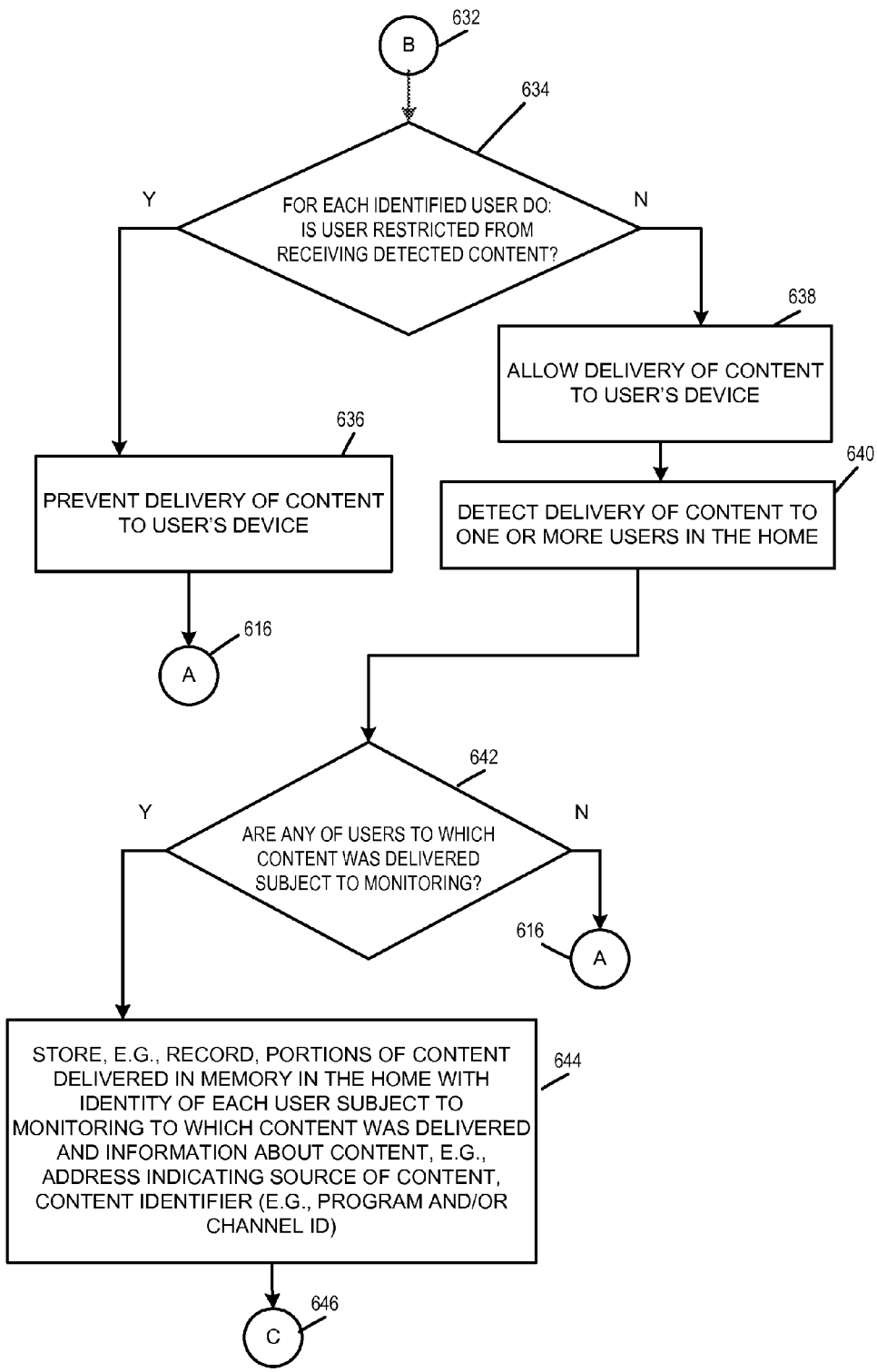
Figure 6C:
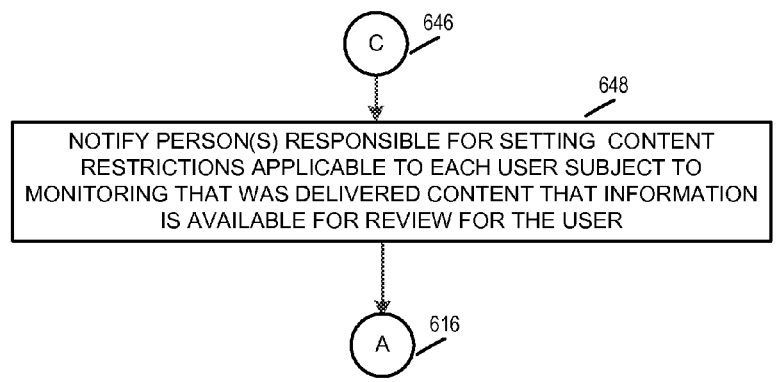

FIG. 6, which comprises the combination of FIGS. 6A, 6B, and 6C, illustrates the steps of exemplary method 600 for operating a home network monitoring device located in a home in accordance with one embodiment of the present invention. The method provides the ability to monitor and restrict the content delivered through the home network to one or more users using CPE devices coupled to the home network. The method 600 also enables the detection and reporting of the status of the network in view of whether the home network is under attack/potentially under attack, e.g., a cyber attack.

The method 600 includes steps performed by various elements of the exemplary home network 100, shown in FIGS. 1-3.

The method 600 starts in step 602, e.g., with the various components in the home network 100 being initialized. Processing proceeds to store configuration information step 604 which includes processing sub-steps 606, 608, 610 and 612. In processing sub-step 606, processor 110 stores user profile information in home network monitoring device 102 memory storage 114. Memory storage 114 may, and in some embodiments does, contain software processing instructions being executed by processor 110. The memory 114 may, and in some embodiments of the present invention does, include both secure and unsecured memory. In some embodiments of the present invention, the memory may be, and is, separate from but coupled to the home network monitoring device 102.

Figure 7:
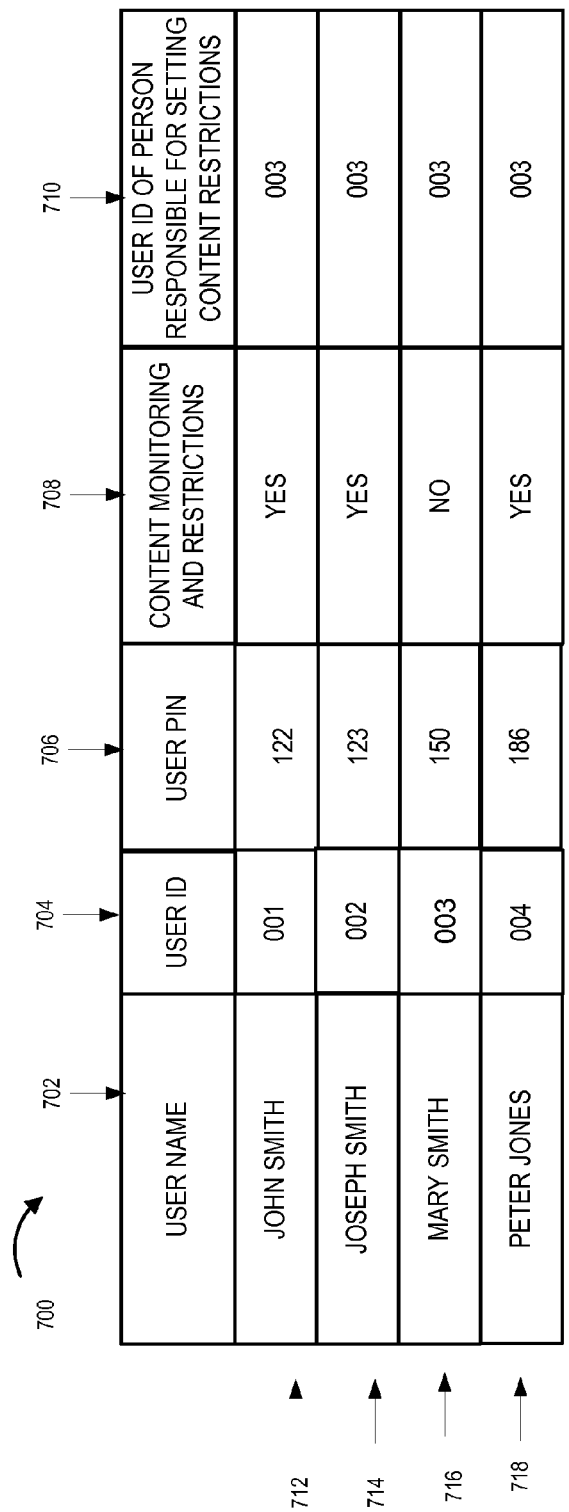
FIG. 7 illustrates a table listing exemplary user profile information in accordance with one embodiment of the present invention.

Table 700 of FIG. 7 depicts information that is included in a user's profile. Table 7 depicts exemplary information associated with four exemplary users of devices coupled to the home network 100. Each row in table 700 corresponds to a different user e.g., John Smith, Joseph Smith, Mary Smith, and Peter Jones. In the FIG. 7 example, John and Joseph Smith are both children; Mary Smith is their parent; Peter Jones is a child and Mary Smith is his guardian, i.e., the person responsible for setting content restrictions on content that may be delivered to him over the home network 100. Column 702 of table 700 of FIG. 7 includes the user name, column 704 includes the user ID, column 706 includes the user PIN (personal identification number), column 708 (content monitoring and restrictions) includes information indicating whether or not the user is subject to content monitoring and delivery restrictions, and column 710 includes the user ID of the person responsible for setting the content restrictions.

Row 712 of table 700 contains the following information associated with user John Smith. John Smith's user name is John Smith (row 712, column 702), user ID is 001 (row 712, column 704), user PIN is 122 (row 712, column 706), John Smith is subject to content monitoring and restrictions—yes (row 712, column 708), and the user ID of the person responsible for setting John Smith's content restrictions is 003 which is his parent Mary Smith (row 712, column 710).

Row 714 provides information associated with user Joseph Smith: user name—Joseph Smith (column 702), user ID—002 (column 704), user PIN 123 (column 706), content monitoring and restrictions—yes (column 708), user ID of person responsible for setting content restrictions—003 (column 710).

Row 716 provides information associated with user Mary Smith: user name—Mary Smith (column 702), user ID—003 (column 704), user PIN 150 (column 706), content monitoring and restrictions—no (column 708), user ID of person responsible for setting content restrictions—003 (column 710). In the exemplary embodiment, Mary Smith's profile has been set up to indicate that Mary Smith is not subject to content monitoring and delivery restrictions and that Mary Smith is the person responsible for setting restrictions on the content that is to be delivered to her. In some embodiments, the user ID of a person responsible for setting content restrictions is set to zero or identified as not applicable for a user who is not designated as being subject to content monitoring and delivery restrictions such as the parent/guardian Mary Smith in the present example. In some embodiments, user Mary Smith may also be designated as the home network monitoring device 102 administrator with additional information included in her profile identifying her as the administrator.

Row 718 provides information associated with user Peter Jones: user name—Peter Jones (column 702), user ID—004 (column 704), user PIN 186 (column 706), content monitoring and delivery restrictions—yes (column 708), user ID of person responsible for setting content restrictions—003 (column 710).

User profile information may be, and in some embodiments is, inputted by the administrator of the home network 100. Access to user profile information is typically password protected so that a user, e.g., a child, cannot change their content monitoring and restriction settings without proper authorization or delete content monitoring information. In some embodiments, the user profile information is inputted by each user when they initially log onto the home network 100 with their content restrictions set to include all restrictions currently applied to any user of the system. In this manner, a new user, e.g., a guest in the house, is able to immediately utilize the home network and CPE devices coupled thereto but has the highest level of restrictions applied to the content that may be delivered to the user. The new user may subsequently have their content restrictions modified in accordance by the user responsible for setting content restrictions for the new user. While the new user will be allowed to input profile information for their user name, user ID and user PIN, their monitoring and content delivery restrictions settings will be automatically set to yes and the user ID of the person responsible for setting content restrictions will default to the administrator, e.g., Mary Smith in the exemplary method. While the home network monitoring device 102 will allow the user to input their user name and user ID it will not allow the user to chose a user name and user ID that is already in use in the system.

In processing sub-step 608, processor 110 stores device profile information in home network monitoring device 102 memory 114. In the exemplary embodiment, device profile information includes a unique device ID and home network 100 device address information. Table 500 of FIG. 5 shows exemplary device profile information that may be, and in some embodiments is, stored in memory 114. Each of the rows 508, 510, 512, 514, 516, and 518 includes device profile information corresponding to a specific device, e.g., CPE device 1, 2 through N, that is coupled or is intended to be coupled to the home network 100. Column 502 lists unique device identifiers with each identifier corresponding to a different device. Each CPE device is assigned a unique device identifier. In some embodiments, this unique identifier of each CPE device that is connected or coupled to the home network 100 is assigned by the administrator of the home network monitoring device. In some embodiments, this unique identifier is assigned by the manufacturer of the device and is incorporated within the device such that the device reports this unique identifier to the home monitoring network device 102 upon attempting to connect to the home network 100. Column 504 lists the device type of each of the devices e.g., computer, lap top, smart phone, set-top box. This information may be, and in some embodiments is, used in determining how the stored content and associated information should be presented to a parent/guardian/supervisor reviewing the stored information on the display. The home network monitoring device may, and in some embodiments does, provide different user interfaces tailored to the specific capabilities of the device being utilized by the supervisor/parent/guardian. Column 505 lists the user IDs of the individuals permitted to use the device. Column 506 lists the unique device address associated with the device on the home network. Row 508 lists information corresponding to CPE device 2 128. CPE device 2 128 has a unique device identifier 8801 (row 508, column 502); device type is computer (row 508, column 504), permitted users are user ID 003 (row 508, column 505), and unique device address is ADDRESS 1 (row 508, column 506). ADDRESS 1 can be any network address such as an Ethernet address if the home network 100 is an Ethernet network. Row 510, 512, 514, 516 and 518 each similarly list information corresponding to a different device that is coupled to or intended to be coupled to the home network 100 of the exemplary embodiment.

In sub-processing step 610, processor 110 initializes the I/O Interfaces 104 and 108 and stores configuration and signaling information necessary to communicate with the external content sources/networks and the CPE devices coupled to the home network 100.

In sub-processing step 612, processor 110 initializes the content restrictions for each user defaulting each user to have no restrictions on content delivery. In some embodiments, processor 110 also initializes each device connected to the home network 100 as having no restrictions on content to be delivered to the device. The content monitoring and restriction settings as well as other configuration data is stored in non-violate memory so that the home network monitoring device does not lose its configuration data when the device loses power. Additionally, the home network monitoring device is configured such that it can only be reset to its default system parameters through use of a special password. In this manner, only the system administrator can reset the system.

From processing step 604, processing proceeds via connection node A 616 to detection steps 618, 622 and 626. While an exemplary ordering of the processing steps of the exemplary method 600 is shown as one of skill in the art will appreciate, the ordering of the steps may be varied. At processing step 618, detection module 202 of monitoring module 116 detects a request from a user/person responsible for setting a user's content delivery restrictions to restrict content delivered to a user of the home network 100 and/or a device, e.g., a CPE device to be coupled to the home network 100. The request may be, and in some embodiments of the present invention, are messages resulting from selections made from a menu of options displayed on a television set to a user logged into the system by entering his or her user ID and personal identification number. A remote control is one method by which a user can input his restriction selection requests. Another method in which a user can input his content restriction requests is through inputting the restriction information directly into the home network monitoring device through one of the I/O Interfaces. Another way in which a user may input user content restrictions is through a computer communicating with the home network monitoring device either directly or through the home network 100. As part of the detection process, the detection module 202 will verify that the user ID of the person requesting the restriction of the delivery of content to the user is the user ID of a person identified in the user's profile as being responsible for setting content delivery restrictions for the user. This may be, and in some embodiments is achieved, through a comparison of the requestor's user ID to the user ID listed in the profile of the user whose content delivery is to be restricted.

Upon detection of the request to restrict the content delivered to a user, processing proceeds to step 620. At step 620, content restriction module 118 updates the user's delivery content restrictions in memory storage 116 in accordance with the detected request. In some embodiments instead of the detection module 202 performing a verification check on the requestor's user ID, prior to updating the user's delivery content restrictions, the content restriction module 118 will check the user's profile to verify that the user ID of the user/person requesting to update the content restriction is identified as one of the users/persons responsible for setting content restrictions for the user. For example, in connection with the information provided in FIG. 7, if the user whose content delivery restrictions are to be updated has a user ID of 001 and the person requesting to set the content restrictions has a user ID of 002 then the request would be denied as the person associated with user ID 002 is not one of the persons responsible for setting content restrictions for John Smith. However, if the user ID of the person making the request has a user ID of 003 then the content delivery restrictions would be updated as Mary Smith who has user ID 003 is designated as a person responsible for setting content restrictions for John Smith who has user ID 001. Exemplary requests for content delivery instructions include restrictions for blocking content delivery from specific website addresses, cable channels, programs based upon program ID or source information such as IP addresses, blocking of television programs based on the parental rating codes, blocking of movies based on the movie rating codes, and blocking of e-mail based on e-mail addresses. Table 400 of FIG. 4 lists exemplary content restriction information that is stored in memory storage 114. Column 402 lists exemplary content restrictions, column 404 lists the user IDs for which restrictions are to be applied, and column 406 lists the devices for which restrictions are to be applied. Each row 408, 410, 412, 416, 418, 420, 422, 426, and 428 lists a content restriction in column 402, the user IDs for which the restriction is to be applied in column 404, and the device IDs for which the restriction is to be applied in column 406. For example, row 408 lists that the PORN VIDEO CHANNEL should be restricted that is prevented from being delivered to users with user IDs 001, 002, and 004 and the device having device ID 8805. By using the exemplary information from tables 400 and 700, it becomes clear that John Smith, Joseph Smith and Peter Jones are designated as restricted from viewing the PORN VIDEO CHANNEL. The PORN VIDEO CHANNEL entry can, and in some embodiments, does include the channel ID and/or source address for the PORN VIDEO CHANNEL the content of which is to be blocked from being delivered to John and Joseph Smith and Peter Jones. The PORN VIDEO CHANNEL content is also listed as being restricted from being delivered to the device having device ID 8805. Table 5 lists that device ID 8805 is only permitted to be used by user ID 004 Peter Jones. As Peter Jones is restricted from viewing the PORN VIDEO CHANNEL the device with user ID is similarly restricted. Note, however, that the other devices listed in table 500 (devices with device IDs 8801, 8802, 8803, 8804, and 8806) all identify user ID 003 as being permitted to use each of the additional devices listed. User ID 003 from exemplary user profile table 700 of FIG. 7 lists this user as Mary Smith and indicates that Mary Smith has no content restrictions. As a result, none of the other devices listed in table 500 have content restrictions applied. In some embodiments, new user devices are permitted to register and operate on the home network but all content restrictions are applied to the device. This allows guests to use the home network 100 while preventing the users from viewing/listening to content deemed objectionable.

Upon the completion of updating the user's content restrictions in step 620, this portion of the method is completed and processing returns to detection steps 618, 622, and 626 via connection node A 616. It should be noted that processing detection steps 618, 622, and 626 are constantly operating as the method allows for parallel and/or multi-threaded processing so that detection of multiple requests and/or detection of content to be delivered to one or more users can be processed concurrently.

At processing step 626, monitoring module 116 of home network monitoring device 102 detects content to be delivered to one or more devices in the home network and the user or users of the device(s). More particularly, detection module 202 of monitoring module 116 detects that content is to be delivered to one or more devices, e.g., CPE 1 (126), CPE 2 (128) through CPE N (130) in the home network. In the exemplary embodiment, a user needs to login to the home network providing their user name and/or user ID and user personal identification number (PIN) to be able to gain access to the network through a device coupled to the network. The user name and/or user ID and personal identification number are entered into the device by the user. The device sends the information over a communication link connecting the device to the home network monitoring device. This example is now further described using the exemplary devices and users and the corresponding information provided in tables 500 and 700 of FIGS. 5 and 7 respectively. For this example, CPE device 1 126 is a computer connected over the communication link 132 to home network monitoring device 102. In response to a prompt at the CPE device 1 126, user John Smith logs into the home network entering his user ID, 001, and user PIN, 122. This information is sent to the control module 138 of home network monitoring device 102 via communication link 132, I/O Interfaces 108, and communication link 120.

In addition to the user information, the CPE device 1 126 also transmits its device identifier information 8802. The control module 138 verifies that CPE device 1 126 is permitted to access the home network by verifying its device identifier number. If the device identifier does not match one of the device identifiers stored in memory the device is denied access to the home network. In some embodiments, CPE device 1 126 is prompted at this point to register the device with the system so that it may be used on the home network. In some embodiments, the CPE device 1 126 is permitted access to the home network when the device identifier does not match one of the devices registered with the system but the capabilities of the device are restricted to that of a guest device. For example, in some embodiments of the present invention, a guest device is only permitted to access the Internet but not other devices or services available on the home network 100.

Once the CPE 1 126 identifier has been verified as being a device allowed to access the home network 100, the control module 138 verifies the user information provided. In this example, it retrieves John Smith's user profile information from memory storage 114 based on the user ID provided and verifies that the user PIN inputted, 122, matches the user PIN for user ID 001. If the user ID was not in the system or the user PIN did not match then access to the home network is denied.

Once a user such as John Smith in the above example has successfully logged in and gained access to the home network 100, the user can request to obtain content from external sources for consumption.

At step 626, when content is provided over link 122 from the external content sources 124, it is received at the home network monitoring device's I/O Interfaces 104. The detection module 202 of monitoring module 116, detects in step 626 that content is to be delivered to one or more devices in the home. The inspection module 204 of the monitoring module 116 inspects the content and information such as signaling and addressing information associated therewith. From step 626, processing proceeds to step 628. At step 628, the inspection module 204 identifies information about the content to be delivered, e.g., the address of the source of the content and content identification information, e.g., program identifier, program name, program series identifier, ratings information, channel upon which the content is to be delivered, length of the content, size of content, type of content (e.g., file type), and the like.

From step 628, processing proceeds to step 630. At step 630, the inspection module 204 identifies users to which the content is to be delivered. One exemplary way this is achieved is wherein the inspection module identifies the address of each device the content is to be delivered to. The inspection module then operates to identify the user ID currently logged in as using each device to which the content is to be delivered. The user ID of the user using each device is information that may be, and in some embodiments, is stored in memory storage 114 upon a user logging into the home network 100 via a device coupled to the home network 100. In some embodiments, devices may be, and are, associated with a single user. In such cases, content to be delivered to the device with that ID is identified as being delivered to the specific user associated with the device. For example using the exemplary information listed in table 500 of FIG. 5, it indicates that the device with device identifier 8801 only has a single user permitted to use the device. The permitted user has user ID 003 which according to the information listed in table 700 of the FIG. 7 is Mary Smith. Therefore, content to be delivered to device 8801 is identified as being delivered to Mary Smith.

In some embodiments, the content may be, and is delivered to, multiple devices being used by the user in the home. The detection module will detect the content being delivered via the home network to each of the devices used by the user. In some embodiments, the user may be, and does use, a wireless device, a personal computer, a lap top, a smart phone, a tablet, a cell phone, a DVR, and a set-top box. The detection module will detect the delivery of content to each of these devices being used by the user. The detection module will also detect a plurality of different types of content being delivered to the user. Exemplary content can and does include video programs, audio programs, images, broadcast and satellite radio, cable and broadcast television, Internet video content provided for example from video hosting sites, vod casts, Internet web page content, text messages, and e-mails.

From step 630 processing proceeds via connection node B 632 to processing step 634. At processing step 634, a for loop is performed wherein for each identified user it is determined whether the user is restricted from receiving the detected content. In the exemplary embodiment, this task is accomplished by the detection module 202. For example, the detection module 202 can compare one or more identifiers, such as the content identifier, source of the content identifier, program identifier, program series identifier, channel identifier for which program was provided on, address from which content was provided (e.g., Internet address, network address, network domain address, e-mail address, web address) associated with the detected content to each user's content restrictions which are stored in the memory storage 116 which may be, and in some embodiments, is non-volatile memory. For each user that is determined the user is restricted from receiving the detected content processing proceeds to step 636. For each user that is determined there is no restriction on the delivery of the detected content processing proceeds to step 638.

At step 636, the content restriction module 118 prevents the delivery of content to each user's device that was determined as being restricted from receiving the content. In the exemplary embodiment, this may be accomplished by not allowing the information to be transmitted via the home network monitoring device to the device or devices being used by the one or more user's restricted from receiving the content. In some embodiments of the present invention, commands can be sent from content restriction module 118 to each device being used by a user restricted from receiving the content causing the device, e.g., a traditional set-top box, to tune the device, e.g., set-top box, to a channel streaming non-restricted content. In some embodiments, a command or set of commands can be sent to turn off the device. In some embodiments of the present invention, for example embodiments in which a restricted user is using an Internet enabled device, the control module 138 injects disconnect packets on both sides of the connection, e.g., toward the external content source via the I/O Interfaces 104 and toward the device via I/O Interfaces 108 and then blocks the connection from re-establishing. In some embodiments, the content restriction module 118 notifies control module 138 via link 120 that the content is to be prevented from being delivered to users who have been identified as being restricted from receiving the detected content and the control module 138 operates to prevent the delivery of the detected content for example by implementing one or more of the exemplary methods described above.

From processing step 636, processing returns to detection steps 618, 622, and 626 via connection node A 616.

For each identified user who has been determined in step 634 that there is no restriction on the delivery of the detected content, at step 638 the content restriction module allows the delivery of content to each of the user's devices. From step 638, processing proceeds to step 640 wherein detection module 202 detects the delivery of content to the one or more users in the home via the home network. This may be, and in some embodiments is, accomplished by the detection device monitoring the delivery of content being outputted to devices via the I/O Interfaces 108. As previously noted, based on the device addresses and user login information the users to which the content is delivered may be, and in some embodiments is, determined. In some embodiments, the detection module 202 obtains the identification of the users to which the content is delivered based on the processing that occurred in step 634.

Upon the detection of the delivery of content to one or more users in the home in step 640 processing proceeds to decision step 642. At decision step 642, monitoring module 116 determines whether any of the users to which content was delivered is subject to monitoring. If none of the users to which content was delivered is subject to monitoring then processing returns to detection steps 618, 622 and 626 via connection node A 616. If at decision step 642, monitoring module 116 determines that any of the users to which content was delivered are subject to monitoring then processing proceeds to step 644.

At step 644, monitoring module 116, stores, for example records, portions of content delivered to the one or more users subject to monitoring in the home with the identity, e.g., user ID and/or user name, of each user subject to monitoring to which content was delivered and information about the content and its consumption, e.g., address indicating source of content, content identifier (e.g., program and/or channel ID, program series ID), amount of time spent by user consuming content, e.g. viewing the television program, and number of times content was consumed (e.g., number of times user repeatedly watching the same program). For example, the monitoring module 116 may, and in some embodiments does, store in memory storage 114 the first 30 seconds of a television program that will include the television ratings and beginning of the television program. The size of the portion of the content whether in time or memory size may be, and in some embodiments, is a parameter that is adjustable by the parent, supervisor or guardian responsible for setting content restrictions on one or more users, e.g., children. In some embodiments, the entire content delivered may be, and is, stored in memory storage 114. In some embodiments, the portions of content, e.g., portions of a video on-demand movie, are stored in encrypted format in memory storage 114. In some embodiments, those portions of content received at the home network monitoring device in encrypted format are stored in encrypted format and/or within a secure memory while those portions of content received at the home network monitoring device 102 in unencrypted format are stored in unencrypted format. In some embodiments, the portions of content delivered to each user are stored in a separate memory storage device within the home coupled to the home network monitoring device 102 but not contained within the home network monitoring device. In some embodiments, the portions of content are stored in a centralized storage device included in said home network monitoring device. In some embodiments, the portions of content stored for each user is contained in a separate memory storage device. In some embodiments, the memory storage device 114 used for storing portions of content delivered to one or more users of the home network 100 also supports home network video recorder functionality.

In some embodiments, a home network video recorder device coupled to the home network 100 or the home network monitoring device 102 is used to store the portions of content delivery to users in the home.

From step 644 processing proceeds via connection node C 646 to notification step 648 wherein the reporting module 112 notifies the person(s)/user(s) responsible for setting content restrictions applicable to each user subject to monitoring that was delivered content that information is available for review and the user who received the content. This notification may be, and in some embodiments is, achieved through an e-mail notification. In some embodiments, this task is performed by the reporting module 112 notifying the responsible person via a message when they log onto the home network 100. In some embodiments, this notification occurs as a report generated at the end of a fixed period of time, e.g., end of each day or week, that is sent to the persons responsible for setting restrictions on each user. In some embodiments, the notification occurs when the user logs into the home network monitoring device 102. After the completion of the notification step, processing returns via connection node A 616 to detection steps 618, 622, and 626.

In detection step 622, detection module 202 of monitoring module 116 detects a request from a person/user responsible for setting user content restrictions to review information stored regarding content delivered to a user for which the person is responsible. In some embodiments, the request may be, and is, a message sent by the person responsible for setting restrictions via a device coupled to the network from which the user logged on to be permitted access to the home network 100. For example, from a computer coupled to the home network 100. In some embodiments, the home network monitoring device includes a user input device such as a keyboard, a display and a speaker wherein the persons responsible for setting content restrictions access the stored content data and user and device profile and other associated data via the user input device to display and hear the information for review on the device's display and speaker.

After the detection module 202 has detected a request to review information associated with the content delivered to a user, the detection module 202 verifies that the person/user is listed as one of the persons/users who is responsible for setting restrictions on the user for which the information was requested. For example, by comparing the user ID of the person/user making the request to the user ID of the persons responsible for setting content restrictions stored in the profile of the user whose delivered content is to be reviewed. For example, in accordance with the example of FIG. 7, Mary Smith user ID 003 is listed as the person/user responsible for setting content restrictions on John Smith user ID 001. If a request to access information regarding the content reviewed by John Smith user ID 001 is received from user ID 002, Joseph Smith, the request would be denied and the detector module 202 would not register a detected request. However, if the request was confirmed as coming from user ID 003, Mary Smith, then detection module 202 would register a detected request from a person/user responsible for setting user content restrictions and processing proceeds to step 624.

At step 624 control module 138 presents to the requestor some of the stored portions of content that were delivered to the user along with additional information such as for example, the source identifier, program identifier, channel identifier, title, any detected ratings associated with each portion of content. The requestor may be, and in some embodiments is, provided a menu on the screen of the device listing each portion of content consumed by the user and associated information that is available including for example, the start time of consumption, end time of consumption, duration of consumption, content identifier, source of content, channel identifier, network address of source, Internet address, e-mail source address, ratings associated with content, number of times network address of source delivered content, number of e-mails from source of content. From step 624, processing returns to detection steps 618, 622, and 626 via connection node A 616. In some embodiments, the requestor is provided an actionable link to the content source for example a link to an Internet address so that the requestor can connect to the source of the content and investigate whether the source should be restricted from further delivery of content to the user being monitored. In some embodiments, a presentation module performs processing step 624. In the exemplary embodiment, the control module 138 includes a presentation sub-module which performs step 624 and is responsible for formatting and presenting content data and user information in response to requests for such information. In some embodiments this includes constructing and sending visual and/or audio menus to be played or displayed on the device or devices being used by the requestor in response to requests which can include selections from the menu to present content and/or associated information which has been stored in the memory. In some embodiments, the presentation module is responsible for reformatting the content so that it can be displayed and/or played back on the particular device from which the request was received. This can, and in some embodiments does, include changing files from one format to another such as changing .wav files to MPEG files and/or only sending an audio portion of a video program if the device from which the request was received does not support video. In other instances, programs may be, and are, reformatted from high definition TV format to standard definition television format or from standard definition television format to high definition format so that the stored content may be viewed on either a standard definition television set or a high definition television set based on the information available regarding the audio and video playback capabilities supported on the device from which the request is received.

Figure 8:
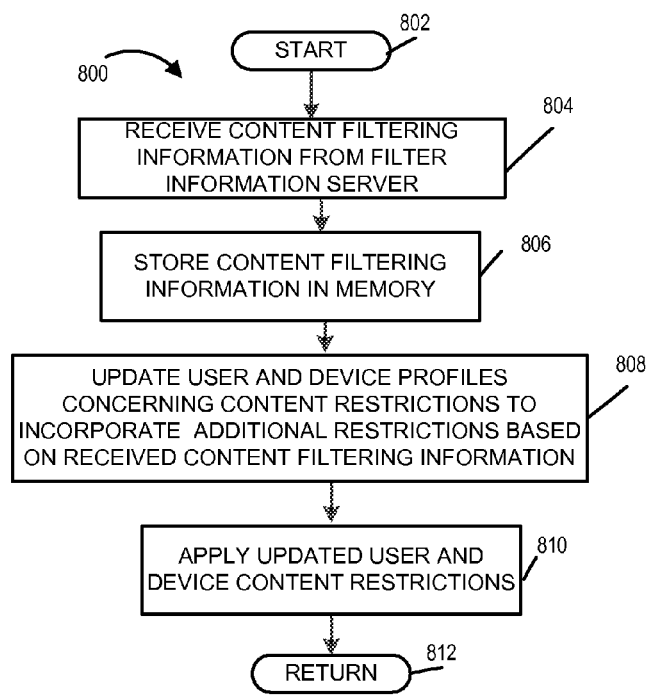
FIG. 8 illustrates the steps of an exemplary method of receiving and utilizing filtering information in accordance with one embodiment of the present invention.

FIG. 8 illustrates the steps of an exemplary method of receiving and utilizing filtering information in accordance with one embodiment of the present invention. This method may be, and in some embodiments is, implemented as a subroutine that is performed each time content filter information is received from a filter information server such as filter information server 142 of FIG. 1. Exemplary content filtering information that may be, and in some embodiments is, received includes information identifying an Internet content source which is to be blocked, content rating information indicating a rating assigned to particular content, or information identifying content which is to be blocked. Processing begins at start step 802 and proceeds to step 804. At step 804, I/O Interfaces 104 receives content filtering information over communication link 122 from filter information server 142. Processing then proceeds to step 806 wherein processor 110 operates to store the content filtering information received via I/O Interfaces 104 in memory storage 114 using communication link 120. From step 806, processing proceeds to step 808 wherein processor 110 operates to update user and device profiles concerning content restrictions to incorporate additional restrictions based on the received content filtering information. In some embodiments, the content restriction module updates the content restriction information in the user and device profiles. From step 808 processing proceeds to step 810 wherein content restriction module 118 applies the updated user and device content restrictions to content to be delivered via the home network to the users and devices operating on the home network. From step 118 processing proceeds to return step 812 wherein processing returns to the main routine. In some embodiments the method 600 of FIG. 6 is implemented as a main routine and method 800 of FIG. 8 is implemented as a subroutine that is called upon receipt of content filtering information from a filter information server with the return step 812 returning processing to the steps of method 600. Once the content restrictions have been updated for each user and/or device the monitoring module and content restriction module will apply the updated user and/or device content restrictions to block the delivery of content that is from a source which is identified as an Internet content source which is to be blocked, content with an assigned rating for which blocking has been set, or content which said received content filtering information indicates is to be blocked.

For example, Internet addresses for sites distributing pornographic materials may be, and in some embodiments are, received as part of the content filtering information from filter information server 142. The processor 110 updates each of the user profiles and/or device profiles based on policies or configuration settings inputted by the supervisor/parent/guardian for each user and/or device such as a setting to block all Internet addresses providing pornographic material. The content restriction module 118 then blocks the delivery of content from the identified Internet address received from the filter information server in accordance with the updated user and device content restrictions stored in each user and device profiles. In some embodiments of the present invention, content filtering information received from a filtering server includes content and source identification information for junk e-mail, spam e-mail, and/or potential threats to the home network. For example, the content filtering information may, and in some embodiments does, identify malware, viruses, Internet sites and or content known to be bad or known for distributing viruses, malware and/or identified as potentially involved in cyber attacks.

In some embodiments of the present invention, content restrictions can and do include the following exemplary restrictions: amount of content that can be consumed over a fixed period of time, e.g., restricted to three television programs a day, the amount of time a user may utilize a device over a fixed period of time, e.g., television viewing may be restricted to three hours per day, the amount of time a user many consume various types of content, e.g., a user may be restricted to three premium channel movies per week, the amount of time a user may access various content sources such as Internet addresses, cable channels, podcasts, or YouTube services, the number of e-mails a user may receive from a specific e-mail address, restrictions on the time periods during which a user may access content sources, e.g., restricting TV from being delivered to a user after 11:00 p.m. on a week night.

One embodiment of the present invention includes a method of operating a home network monitoring device located in a home including detecting delivery of content to one or more users in the home; storing, in the home, portions of content delivered to a first user via a home network; presenting some of the stored portions of content to a person responsible for setting content restrictions applicable to the first user; and subjecting further content delivery to the first user via the home network to restrictions established by the person responsible for setting content restrictions applicable to the first user. In some embodiments, the person responsible for setting content restrictions applicable to the first user is a parent; and the first user is a child. In some embodiments of the present invention, storing, in the home, portions of content delivered to a first user includes storing at least some portions of each of a plurality of different types of content being delivered to the first user. In some embodiments of the present invention, the different types of content include at least two of: cable television content, Internet video content, Internet web page content (e.g., browser viewing content), E-mail content, or video game content. In some embodiments of the present invention, detecting delivery of content includes detecting content being delivered to multiple devices used by said first user via the home network. In some embodiments of the present invention devices used by the first user include a wireless device, a personal computer, or a set top box. In some embodiments of the present invention, the step of detecting is performed in one of a cable modem, a router or a set top box through which said content is delivered. In some embodiments of the present invention detecting includes the use of stateful packet inspection when said content is directed to an IP device being used by the first user. In some embodiment of the present invention the stateful packet inspection includes detecting a website address which is the source of content being delivered to the first user. In some embodiments of the present invention the stateful packet inspection further includes performing an inspection of at least one of audio or video packet payload content.

In some embodiments of the present invention storing includes storing said portions of content delivered to a person along with address information indicating the source of the stored content. In some embodiments of the present invention the storing of the portions of content delivered to a person along with the address information indicating the source of the stored content as well as other information about the content and/or the user includes storing content and information in a centralized storage device included in the home network monitoring device, and storing includes storing portions of content being delivered to a plurality of other users in said home in said storage device. In some embodiments of the present invention the centralized storage device used for storing at least a portion of the content being delivered to a user also supports home network digital video recorder functionality.

In some embodiments of the present invention the home networking monitoring device detects when there is a potential attack on the home network. In some embodiments, the home network monitoring device upon the detection of the potential attack on the home network reports the address or addresses from which the potential attack is emanating to an entity outside of the home network along with information about the potential attack. In some embodiments of the present invention, the entity outside of the home network is a government entity and incoming traffic associated with the potential attack is routed to the government agency. In some embodiments, the information reported to the outside entity is sent to a system, e.g., a server, operated or controlled by the outside entity. In some embodiments, the incoming traffic which is sent to the outside entity is sent to a system and/or server operated or controlled by the outside entity.

In some embodiments of the present invention, the supervisor/parent/guardian is able to monitor, navigate and control content being viewed based on profiles and parent control policies implemented through restriction settings. Examples of the parent control policies that are set by supervisor/parent/guardian include: audio and/or video programming (including programs that contain audio, video and/or alternative data tracking), gaming programming, Internet programming, wireless content, filters based restrictions for programming that are deemed as 'indecent' and 'objectionable', filters based restrictions for closed captioning, ratings for commercials, V-Chip ratings, TV parental guideline ratings, movie ratings, and programming packaging and pricing, e.g., ratings on ads.

Some embodiments of the present invention include a method of operating a home network monitoring device located in a home including detecting delivery of content to one or more users in the home; storing, in the home, portions of content delivered to a first user via a home network; presenting some of the stored portions of content to a person responsible for setting content restrictions applicable to the first user; and subjecting further content delivery to the first user via the home network to restrictions established by the person responsible for setting content restrictions applicable to the first user, receiving content filtering information from a filter information server, said filtering information including at least one of: information identifying an Internet content source which is to be blocked, content rating information indicating a rating assigned to particular content, or information identifying content which is to be blocked; and wherein subjecting further content delivery to the first user via the home network to restrictions established by the person responsible for setting content restrictions applicable to the first user includes blocking content if said content is: i) from a source which is identified as an Internet content source which is to be blocked; ii) content with an assigned rating for which blocking has been set; or iii) content which said received content filtering information indicates is to be blocked.

In some embodiments of the present invention, subjecting further content delivery to the first user via the home network to restrictions established by the person responsible for setting content restrictions applicable to the first user includes: applying content rating restrictions to restrict access to content or web sites which have ratings which satisfy a content restriction setting applicable to the first user; and wherein the method further includes: applying a different set of content restriction settings than is used for the first user, when determining if content is to be restricted from delivery to a second user.

Some embodiments of the present invention include a home network monitoring device comprising: a monitoring module in a home, configured to detect delivery of content to one or more users in the home via a home network; memory in the home including stored portions of content delivered to a first user; a presentation module configured to present some of the stored portions of content to a person responsible for setting content restrictions applicable to the first user; and a content restriction module configured to subject further content delivery to the first user via the home network to restrictions established by the person responsible for setting content restrictions applicable to the first user, said content restriction module blocking content which satisfies a content restriction setting from being delivered to the first user. In some embodiments of the present invention, the monitoring module of the home network monitoring device is configured to detect delivery of content via the home network to multiple devices used by said first user, and the devices used by said first user include a wireless device, a personal computer, or a set top box. In some embodiments, the home network monitoring device is one of a cable modem, a router or a set top box through which said content is delivered. In some embodiments, the home network monitoring device is a separate stand alone device connected to the home network through which all inbound traffic from sources outside the home are directed.

In some embodiments of the present invention include a non-transitory computer readable medium having machine executable instructions stored thereon for controlling a processor in a home network monitoring device located in a home, the non-transitory computer readable medium including: code for controlling the processor to detect delivery of content to one or more users in the home via a home network; code for controlling the processor to store in memory located in the home, portions of content delivered to a first user; code for controlling the processor to present some of the stored portions of content to a person responsible for setting content restrictions applicable to the first user; and code for controlling the processor to subject further content delivery to the first user via the home network to restrictions established by the person responsible for setting content restrictions applicable to the first user.

In some embodiments of the present invention, the home network monitoring device is configured to monitor and restrict the delivery of content to devices in the following manner. The monitoring module 118 of the home network monitoring module monitors content delivered to one or more devices via the home network. The processor 110 stores at least a portion of the content delivered to the one or more devices via the home network in memory storage 114 along with content and source identification information so that the information is associated with the device ID of the device to which the content was delivered. The memory storage 114, may be and in some embodiments is, non-volatile memory. The presentation module and/or control module 138 of the home network monitoring device presents the delivered content and associated information to one or more supervisors, guardians, or parents assigned to set content restrictions on each of the devices operating on the home network after user ID and PIN verification. And the content restriction module applies content restrictions on a per device basis restricting the delivery of content via the home network per policies or settings inputted by the supervisors, parents, and/or guardians assigned to each device. Content restrictions can be applied across all devices on the network or individual devices on the network.

In various embodiments system/apparatus elements described herein are implemented using one or more modules which are used to perform the steps and/or sub-steps corresponding to one or more methods of the present invention, for example, a detection module performs the step of detecting content to be delivered to one or more users and/or devices in the home. Each step may be performed by one or more different software instructions executed by a computer processor, e.g., a central processing unit (CPU). In some embodiments the modules may be and are implemented in software. In some embodiments, the modules may be and are implemented as servers. In some embodiments the modules may be, and are implemented in hardware, e.g., as circuits. In some embodiments the modules may be, and are, implemented in a combination of hardware and software.

At least one apparatus or system implemented in accordance with the present invention includes a means for implementing each of the various steps which are part of the methods of the present invention. Each means may be, e.g., an instruction, processor, hardware circuit and/or combination of elements used to implement a described step. Many of the above described methods or method steps can be implemented using machine, e.g., computer, executable instructions, such as software, included in a machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow. Such variations are to be considered within the scope of the invention.

What is claimed is:

1. A method of operating a home network monitoring device located in a home including:
setting content restrictions for a first user;
detecting, in the home network monitoring device, delivery of content to one or more users in the home, said first user being one of said one or more users;
storing, in the home, portions of content delivered to said first user via a home network along with information about the content and its consumption;
detecting a request, from a person responsible for setting user content restrictions applicable to said first user, to review content delivered to said first user:
presenting, following said request, some of the stored portions of content to the person responsible for setting content restrictions applicable to the first user, said presenting some of the stored portions of content to the person responsible for setting content restrictions applicable to the first user being performed after the delivery of the content to the first user;
updating the content restrictions for the first user; and
subjecting further content delivery to the first user via the home network to the updated restrictions established by the person responsible for setting content restrictions applicable to the first user.

2. The method of claim 1,
wherein the person responsible for setting content restrictions applicable to the first user is a parent; and
wherein the first user is a child.

3. The method of claim 1,
wherein detecting, in the home network monitoring device, delivery of content to one or more users in the home includes detecting delivery of said content to the first user; and
wherein storing, in the home, portions of content delivered to a first user includes storing at least some portions of each of a plurality of different types of content being delivered to the first user.

4. The method of claim 3,
wherein said storing is performed after detecting delivery of said content to the first user; and
wherein the different types of content include at least two of: cable television content, Internet video content, Internet web page content, E-mail content, or video game content.

5. The method of claim 1,
wherein detecting delivery of content includes detecting content being delivered to multiple devices used by said first user via the home network.

6. The method of claim 5,
wherein detecting delivery of content includes detecting content being delivered to multiple devices used by said first user via the home network; and
wherein said devices used by said first user include a wireless device, a personal computer, or a set top box.

7. The method of claim 1, wherein said home network monitoring device is one of a cable modem, a router or a set top box through which said content is delivered.

8. The method of claim 7, wherein said detecting includes the use of stateful packet inspection when said content is directed to an IP device being used by said first user.

9. The method of claim 8, wherein said stateful packet inspection includes detecting a website address which is the source of content being delivered to the first user.

10. The method of claim 9 wherein said stateful packet inspection further includes performing an inspection of at least one of audio or video packet payload content.

11. The method of claim 1, wherein said storing includes storing said portions of content delivered to a person along with address information indicating the source of the stored content.

12. The method of claim 11, wherein said storing includes storing portions of content delivered to a person along with address information indicating the source of the stored content in a centralized storage device included in said home network monitoring device, the method further comprising:
storing portions of content being delivered to a plurality of other users in said home in said storage device.

13. The method of claim 12, wherein said centralized storage device supports home network digital video recorder functionality.

14. The method of claim 1, further including detecting a potential attack on the home network.

15. The method of claim 14, wherein upon the detection of the potential attack on the home network reporting the address or addresses from which the potential attack is emanating to an entity outside of the home network along with information about the potential attack.

16. The method of claim 15 wherein the entity outside of the home network is a government entity and incoming traffic associated with the potential attack is routed to the government agency.

17. The method of claim 1, further comprising:
receiving content filtering information from a filter information server, said filtering information including at least one of: information identifying an Internet content source which is to be blocked, content rating information indicating a rating assigned to particular content, or information identifying content which is to be blocked; and
wherein subjecting further content delivery to the first user via the home network to restrictions established by the person responsible for setting content restrictions applicable to the first user includes blocking content if said content is:
i) from a source which is identified as an Internet content source which is to be blocked;
ii) content with an assigned rating for which blocking has been set; or
iii) content which said received content filtering information indicates is to be blocked.

18. The method of claim 1,
wherein subjecting further content delivery to the first user via the home network to the updated content restrictions established by the person responsible for setting content restrictions applicable to the first user includes:
applying content rating restrictions to restrict access to content or web sites which have ratings which satisfy a content restriction setting applicable to the first user; and
wherein the method further includes:
applying a different set of content restriction settings than is used for the first user, when determining if content is to be restricted from delivery to a second user.

19. A home network monitoring device comprising:
a content restriction module configured to set content restrictions for a first user;

a monitoring module in a home, configured to detect delivery of content to one or more users in the home via a home network, said first user being one of said one or more users;

memory in the home including stored portions of content delivered to the first user along with information about the content and its consumption;

a presentation module configured to present, in response to a request from a person responsible for setting user content restrictions applicable to said first user to review content delivered to said first user, some of the stored portions of content to the person responsible for setting content restrictions applicable to the first user; and wherein said content restriction module is further configured to subject further content delivery to the first user via the home network to updated restrictions established by the person responsible for setting content restrictions applicable to the first user, said content restriction module blocking content which satisfies a content restriction setting from being delivered to the first user.

20. The home network monitoring device of claim 19, wherein the monitoring module is further configured to detect delivery of content via the home network to multiple devices used by said first user, and wherein the devices used by said first user include a wireless device, a personal computer, or a set top box.

21. The home network monitoring device of claim 19, wherein said home networking monitoring device is one of a cable modem, a router or a set top box through which said content is delivered.

22. A non-transitory computer readable medium having machine executable instructions stored thereon for controlling a processor in a home network monitoring device located in a home, the non-transitory computer readable medium including:

code for controlling the processor to set content restrictions for a first user;

code for controlling the processor to detect delivery of content to one or more users in the home via a home network, said first user being one of said one or more users;

code for controlling the processor to store in memory located in the home, portions of content delivered to the first user along with information about the content and its consumption;

code for controlling the processor to detect a request, from a person responsible for setting user content restrictions applicable to said first user, to review content delivered to said first user;

code for controlling the processor to present, following said request, some of the stored portions of content to the person responsible for setting content restrictions applicable to the first user;

code for controlling the processor to update the content restrictions for the first user; and code for controlling the processor to subject further content delivery to the first user via the home network to updated restrictions established by the person responsible for setting content restrictions applicable to the first user.

* * * * *